United States Patent
Chou et al.

(10) Patent No.: US 8,060,786 B2
(45) Date of Patent: *Nov. 15, 2011

(54) METHOD FOR RECOVERING BASIC INPUT OUTPUT SYSTEM AND COMPUTER DEVICE THEREOF

(75) Inventors: Yen-Ting Chou, Taipei (TW); Jin-En Liao, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/013,598

(22) Filed: Jan. 25, 2011

(65) Prior Publication Data
US 2011/0126048 A1  May 26, 2011

Related U.S. Application Data

(63) Continuation of application No. 12/329,205, filed on Dec. 5, 2008, now Pat. No. 7,900,091.

(51) Int. Cl.
*G06F 11/00* (2006.01)

(52) U.S. Cl. .......... 714/36; 714/14; 714/22; 713/1; 713/2

(58) Field of Classification Search .......... 714/14, 714/22, 36; 713/1, 2
See application file for complete search history.

(56) References Cited

U.S. PATENT DOCUMENTS

| | | | |
|---|---|---|---|
| 6,757,838 B1 * | 6/2004 | Chaiken et al. | 714/5.11 |
| 7,017,052 B2 * | 3/2006 | Aklilu et al. | 713/300 |
| 7,100,087 B2 * | 8/2006 | Yang et al. | 714/36 |
| 7,313,685 B2 * | 12/2007 | Broyles et al. | 714/36 |
| 2002/0087855 A1 * | 7/2002 | Dykes et al. | 713/2 |
| 2004/0236936 A1 * | 11/2004 | Bulusu et al. | 713/2 |
| 2008/0184023 A1 * | 7/2008 | Shih | 713/2 |
| 2008/0250252 A1 * | 10/2008 | Tasher et al. | 713/189 |
| 2009/0240934 A1 * | 9/2009 | Chou | 713/2 |

* cited by examiner

*Primary Examiner* — Charles Ehne
(74) *Attorney, Agent, or Firm* — Morris Manning Martin LLP; Tim Tingkang Xia, Esq.

(57) ABSTRACT

A method for recovering a basic input output system (BIOS) and a computer device thereof are disclosed. The computer device includes a motherboard, a power button, a BIOS storage unit, and an embedded controller. The BIOS storage unit is disposed on the motherboard, and it stores a first boot block code and a second boot block code. When the computer device is connected with a power supply to supply standby power to the motherboard, and the power button is not pressed, the embedded controller detects whether the first boot block code is damaged. If the first boot block code is damaged, the embedded controller recovers the first boot block code via the second boot block code.

7 Claims, 5 Drawing Sheets

METHOD FOR RECOVERING BASIC INPUT OUTPUT SYSTEM AND COMPUTER DEVICE THEREOF

CROSS REFERENCE TO RELATED APPLICATIONS

This application is a continuation of a U.S. application Ser. No. 12/329,205, filed Dec. 5, 2008, entitled "METHOD FOR RECOVERING BASIC INPUT OUTPUT SYSTEM AND COMPUTER THEREOF," by Yen-Ting Chou and Jin-En Liao, which is incorporated herein by reference in its entirety.

BACKGROUND OF THE INVENTION

1. Field of Invention

The invention relates to a basic input output system (BIOS) protection technique of a computer device and, more particularly, to a method for recovering a BIOS and a computer device thereof.

2. Related Art

In a configuration of a computer system, a basic input output system (BIOS) is the first run software in the computer system. The BIOS provides a most fundamental and direct hardware control for the computer system. The primitive operations of the computer system are completed according to contents of the BIOS. Since the BIOS is an important constituent portion of a computer system, the stability of realizing the functions of the BIOS directly affects normal operations of the computer system.

A BIOS mainly includes two constituent portions: a boot block code and a BIOS main code. The boot block program code is the first run portion at the booting up of a computer system, and it is mainly responsible for a most fundamental and simplest hardware initialization of a computer device. Therefore, once the boot block code has errors, the computer device cannot perform a booting process successfully.

A conventional method for recovering a BIOS is often recovering the BIOS when the computer enters the BIOS after the booting process. Therefore, when the computer cannot be booted up, a user cannot recover the BIOS by himself or herself. The user has to send the motherboard back to the manufacturer for repairing or exchanging a new motherboard, which is rather inconvenient.

SUMMARY OF THE INVENTION

One objective of the invention is to provide a method for recovering a basic input output system (BIOS) and a computer device thereof to improve the prior art. When the computer device is connected with a power supply, even if the computer device is not booted up, the computer device can recover the BIOS.

To achieve the objective of the invention, the invention provides a computer device including a motherboard, a power button, a BIOS storage unit, and an embedded controller. The power button is coupled with the motherboard. The BIOS storage unit is disposed on the motherboard, and it stores a first boot block code and a second boot block code. The embedded controller is disposed on the motherboard and coupled with the BIOS storage unit and the power button. When the computer device is connected with a power supply to supply standby power to the motherboard, and the power button is not pressed, the embedded controller detects whether the first boot block code is damaged. If the first boot block code is damaged, the embedded controller recovers the first boot block code via the second boot block code.

The invention further provides a method for recovering a BIOS of a computer device. The computer device includes a motherboard, a power button, a BIOS storage unit, and an embedded controller. The BIOS storage unit stores a first boot block code and a second boot block code. The method includes the following steps. First, a power supply is provided for the computer device to supply standby power to the embedded controller on the motherboard. Before the power button is pressed, the embedded controller is used to detect whether the first boot block code is damaged. If the first boot block code is damaged, the embedded controller recovers the first boot block code via the second boot block code.

In an embodiment of the invention, the power supply is a battery or an alternating current to direct current (AC-DC) converter.

In an embodiment of the invention, the BIOS storage unit further stores firmware of the embedded controller.

In an embodiment of the invention, an embedded controller includes a storage unit storing firmware of the embedded controller.

In an embodiment of the invention, the computer device is a portable computer device, and the BIOS storage unit is a non-volatile memory.

To sum up, in the invention, the embedded controller is utilized to recover boot block codes of a BIOS. Therefore, when a computer device is connected with a power supply, even if the computer device is not booted up, the computer device can recover the BIOS to allow itself to perform a booting process successfully.

These and other features, aspects, and advantages of the present invention will become better understood with regard to the following description, appended claims, and accompanying drawings.

DETAILED DESCRIPTION OF THE INVENTION

Figure 1:
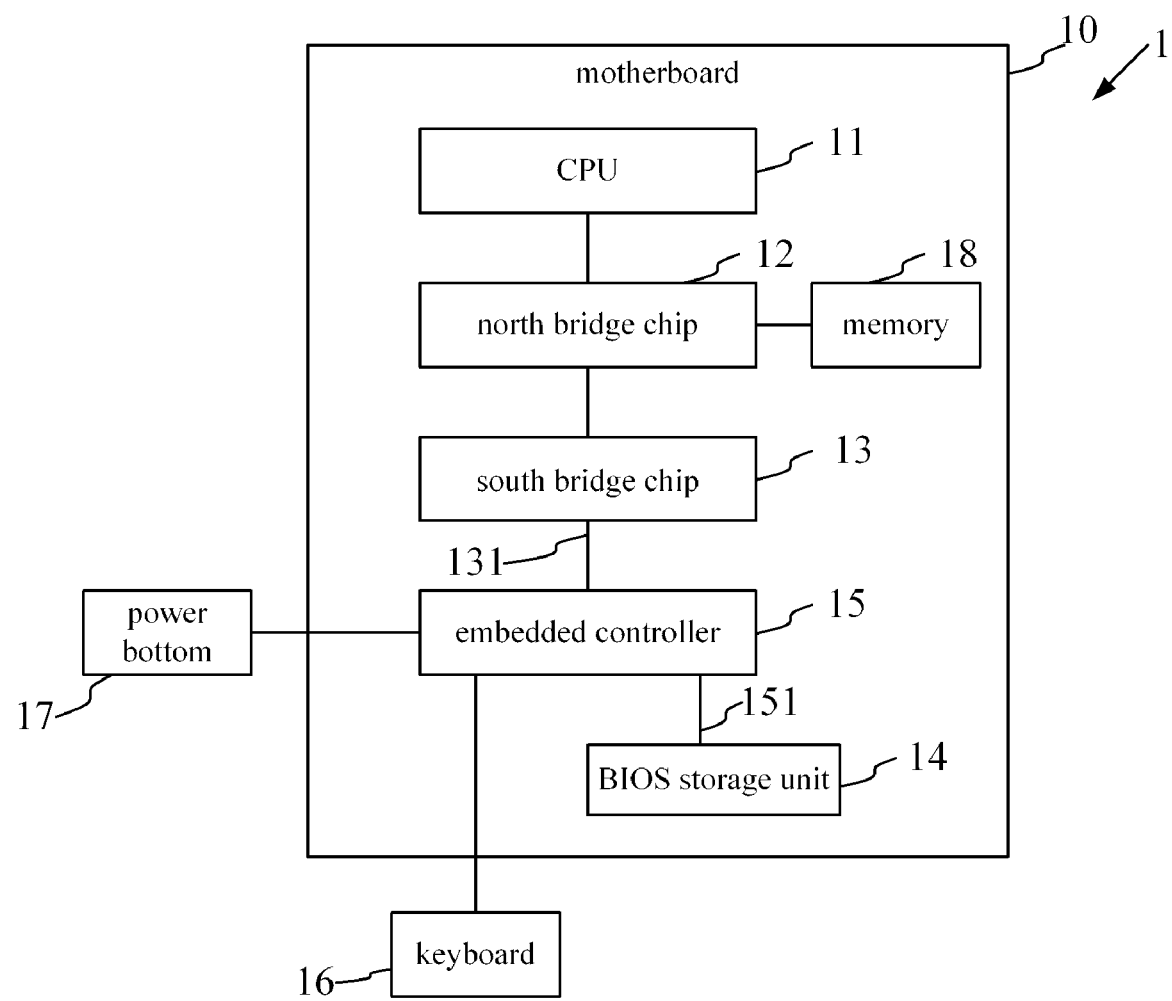
FIG. 1 is a block diagram of a computer device according to an embodiment of the invention.

FIG. 1 is a block diagram of a computer device according to an embodiment of the invention. As shown in FIG. 1, the computer device 1 of the embodiment includes a motherboard 10, a central processing unit (CPU) 11, a north bridge chip 12, a south bridge chip 13, a basic input output system (BIOS) storage unit 14, an embedded controller 15, a keyboard 16, a power button 17, and a memory 18.

The CPU 11, the north bridge chip 12, the south bridge chip 13, the BIOS storage unit 14, the embedded controller 15, and the memory 18 are all disposed on the motherboard 10. The north bridge chip 12 is coupled with the CPU 11, the south bridge chip 13, and the memory 18, respectively. The embedded controller 15 is coupled with the south bridge chip 13, the BIOS storage unit 14, the keyboard 16, and the power button 17, respectively. Furthermore, the power button 17 is coupled with the motherboard 10.

The CPU 11 is used to execute programs of the memory 18, and it is a general known data processing device. Therefore, the functions and the internal structure of the CPU 11 are not described further in detail hereinbelow.

The memory 18 is used to store data and programs, and it is a general known data storing device. Therefore, the functions and the internal structure of the memory 18 are not described further in detail hereinbelow.

The north bridge chip 12 is used to be responsible for contacting the CPU 11 and controlling the memory 18, and it is a general known interface controlling device. Therefore, the functions and the internal structure of the north bridge chip 12 are not described further in detail hereinbelow.

The south bridge chip 13 is used to be responsible for contacting peripherals (not shown), and it is a general known interface controlling device. Therefore, the functions and the internal structure of the south bridge chip 13 are not described further in detail hereinbelow.

The BIOS storage unit 14 is used to store BIOS codes. The BIOS codes are used to provide a most basic and direct hardware control for the computer device 1. The primitive operations of the computer device 1 are in accordance with the contents embedded on the BIOS storage unit 14 to perform a booting process. In the embodiment, the BIOS storage unit 14 is a non-volatile memory such as a flash memory, and it can store the BIOS codes without a power supply. In other embodiments, the BIOS storage unit 14 may be another equivalent memory. The internal structure of the BIOS storage unit 14 is described in detail with FIG. 2.

The embedded controller 15 is used to control a power supply of the computer device 1 and input output peripherals such as the keyboard 16. The BIOS storage unit 14 is coupled with the embedded controller 15 via an X-BUS 151. The embedded controller 15 is coupled with the south bridge chip 13 via a low pin count (LPC) bus 131 (or a serial peripheral interface (SPI) bus). In the embodiment, when a battery (not shown) or an alternating current to direct current (AC-DC) converter (not shown) are inserted in the computer device 1, the battery or the AC-DC converter connected with an alternating current supply can provide power to the motherboard 10 to allow the motherboard 10 to supply 5 V standby power to electronic components on the motherboard 10.

Thereby, the embedded controller 15 can use the standby power to perform related operations. In the embodiment, as long as the embedded controller 15 receives the standby power, and the power button 17 is not pressed (that is, the computer device 1 is not booted up), the embedded controller 15 starts to read contents of the BIOS storage unit 14 to determine whether the contents of the BIOS storage unit 14 are damaged.

When the power button 17 is pressed, the CPU 11 reads an instruction in a specific address of the BIOS storage unit 14 after being reset. In the embodiment, the specific address sent from the CPU 11 first reaches the north bridge chip 12. Then, it is transmitted to the south bridge chip 13. Afterwards, it reaches the embedded controller 15 via the LPC bus 131. At last, it reaches the BIOS storage unit 14 via the X-BUS 151. After the CPU 11 reads the instruction in the sent specific address, the CPU 11 executes the first instruction after being reset. In the embodiment, the embedded controller 15 has a function of connecting the BIOS storage unit 14 and the south bridge chip 13.

Figure 2:
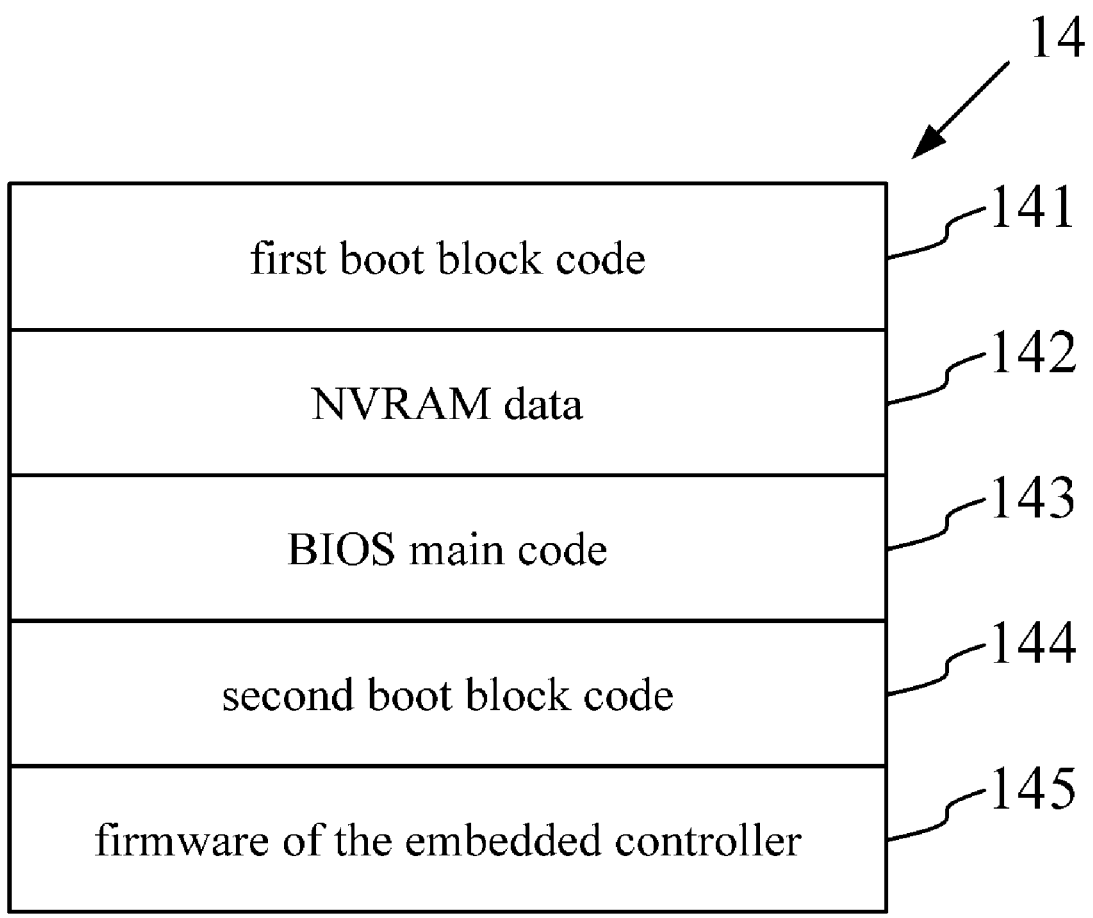
FIG. 2 is a block diagram of a basic input out system (BIOS) storage unit according to an embodiment of the invention.

FIG. 2 is a block diagram of a BIOS storage unit according to an embodiment of the invention. As shown in FIG. 2, the BIOS storage unit 14 stores a first boot block code 141, non-volatile random access memory (NVRAM) data 142, a BIOS main code 143, a second boot block code 144, and firmware of the embedded controller 145.

In another embodiment, the first boot blocked code 141 is stored in a first basic input output system (BIOS) storage unit and a second block code 144 is stored in a second storage unit, where the first and second storages are connected to each other In the embodiment, the first boot block code 141 is used to start simple systems. For example, it is used to support the start of a floppy drive and display of graphic cards. Thus, when the BIOS main code 143 has errors, the first boot block code 141 may be executed to update the BIOS to recover the BIOS main code 143. In the embodiment, the first boot block code 141 and the second boot block code 144 are the same BIOS codes. Thus, if the first boot block code 141 is damaged, the first boot block code 141 is recovered via the second boot block code 144.

In usual cases, when the power button 17 is pressed to boot up the computer, the first boot block code 141 is executed first, and it is mainly responsible for a most fundamental and simplest hardware initialization of the computer device 1. Afterwards, the BIOS main code 143 is decompressed to start the whole computer system.

The NVRAM data 142 are the data that can be retained when power fails, and they are general known data. Therefore, the contents of the NVRAM data 142 are not described further in detail hereinbelow.

The firmware of the embedded controller 145 is general known embedded controller codes. Therefore, the contents of the firmware of the embedded controller 145 are not described further in detail hereinbelow.

Figure 3:
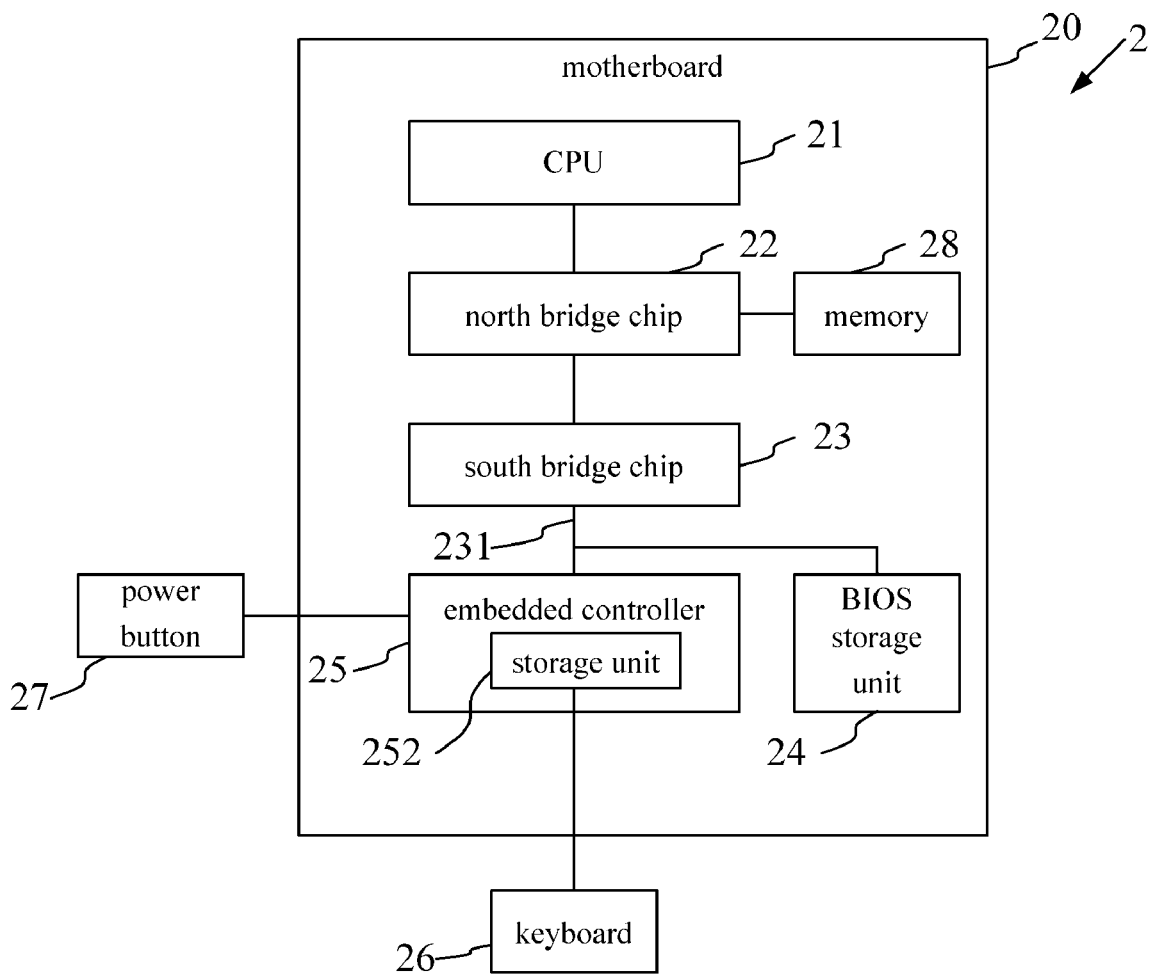
FIG. 3 is a block diagram of a computer device according to another embodiment of the invention.

FIG. 3 is a block diagram of a computer device according to another embodiment of the invention. As shown in FIG. 3, the computer device 2 includes a motherboard 20, a CPU 21, a north bridge chip 22, a south bridge chip 23, a BIOS storage unit 24, an embedded controller 25, a keyboard 26, a power button 27, and a memory 28. In the embodiment, the functions, the coupled relationships, and the internal structures of the motherboard 20, the CPU 21, the north bridge chip 22, the south bridge chip 23, the keyboard 26, the power button 27, and the memory 28 are similar with the functions, the coupled relationships, and the internal structures of the corresponding components in FIG. 1. Therefore, they are not described hereinbelow for a concise purpose.

The difference between the embodiment and FIG. 1 is that the embedded controller 25 in the embodiment includes a storage unit 252 to store the firmware of the embedded controller (not shown). At that moment, the embedded controller 25 and the BIOS storage unit 24 are coupled with a LPC bus 231 together.

When the power button 27 is pressed, the CPU 21 reads an instruction in a specific address of the BIOS storage unit 24 after being reset. In the embodiment, after the specific address sent from the CPU 21 is transmitted to the south bridge chip 23 via the north bridge chip 22, the specific address directly reaches the BIOS storage unit 24 via the LPC bus 231.

Figure 4:
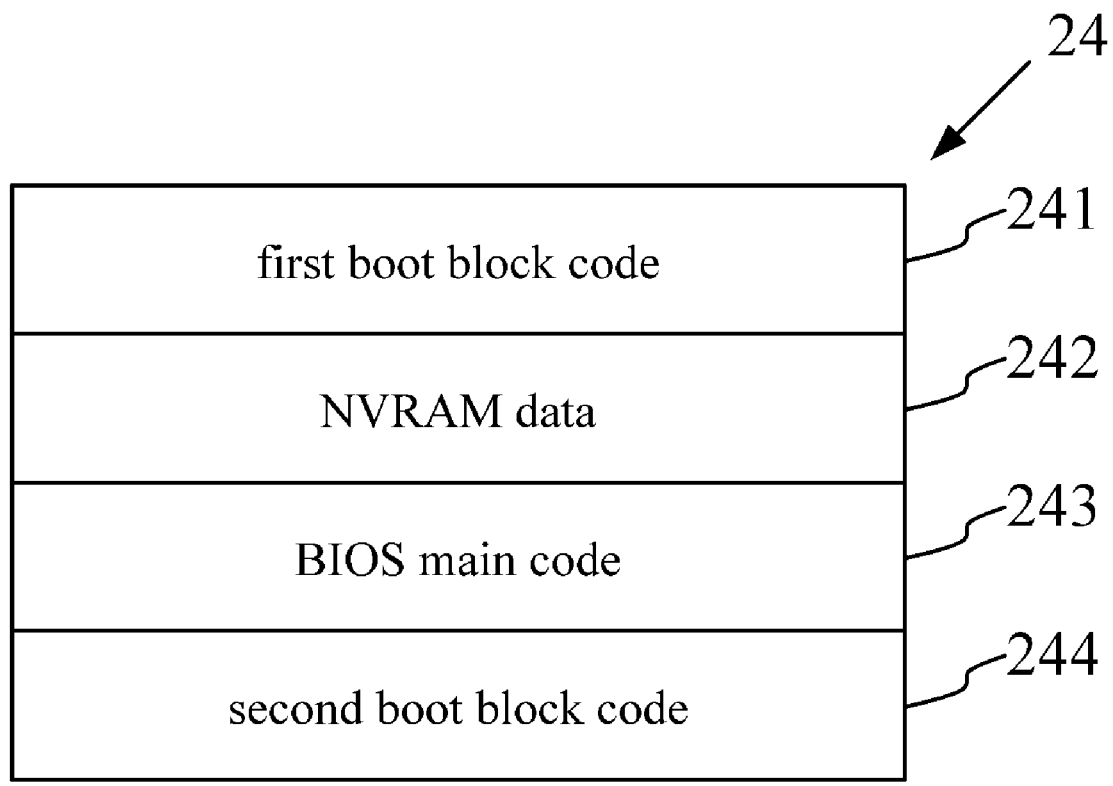
FIG. 4 is a block diagram of a BIOS storage unit according to another embodiment of the invention.

FIG. 4 is a block diagram of a BIOS storage unit according to another embodiment of the invention. As shown in FIG. 4, a BIOS storage unit 24 includes a first boot block code 241, non-volatile random access memory (NVRAM) data 242, a BIOS main code 243, and a second boot block code 244. In the embodiment, the functions of the first boot block code 241, NVRAM data 242, the BIOS main code 243, and the second boot block code 244 are the same with the functions of the first boot block code 141, the NVRAM data 142, the BIOS main code 143, and the second boot block code 144 in FIG. 2.

Therefore, they are not described hereinbelow for a concise purpose.

The difference between the embodiment and FIG. 2 is that the BIOS storage unit 24 in the embodiment does not include the firmware of the embedded controller.

Figure 5:
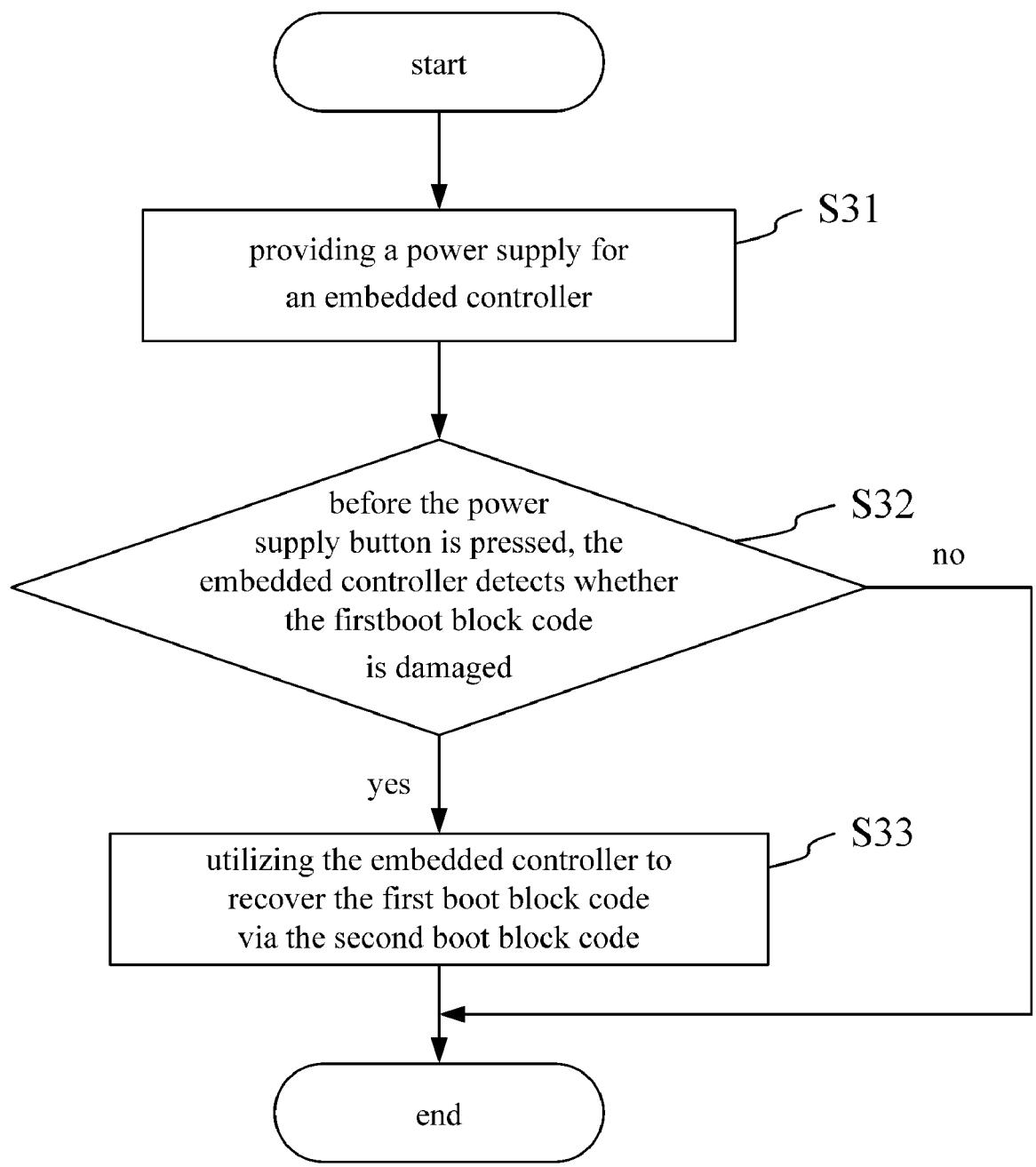
FIG. 5 is a flowchart of a method for recovering a BIOS of a computer device according to an embodiment of the invention.

FIG. 5 is a flowchart of a method for recovering a BIOS of a computer device according to an embodiment of the invention. The computer device may be one of FIG. 1 or FIG. 3. As shown in FIG. 5, first, as stated in step S31, a power supply is provided for an embedded controller. In the embodiment, it is realized by inserting a battery or an AC-DC converter to the computer device. At that moment, the embedded controller starts to operate.

Then, in step S32, before the power button is pressed (when the computer is not booted), the embedded controller detects whether the first boot block code in the BIOS storage unit is damaged. In the embodiment, the embedded controller may use checksums or check codes to detect. If the first boot block code is damaged, step S33 is performed. If the first boot block code is not damaged, the embedded controller does not need to perform a recovering action and the flow path is over. The power button waits to be pressed.

In step S33, the embedded controller starts to perform the recovery. The embedded controller recovers the first boot block code via the second boot block code of the BIOS storage unit. In the embodiment, the embedded controller can read the second boot block code and use the second boot block code to cover the first boot block code. The recovery is completed, and the power button waits to be pressed.

To sum up, in the embodiment of the invention, the embedded controller is used to recover the boot block codes of the BIOS. When the computer device is connected with a power supply, even if the computer device is not booted up, the computer device may recover the boot block codes of the BIOS to allow the computer device to perform the booting process successfully.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A computer device comprising:
a motherboard;
a power button coupled with the motherboard;
a first boot blocked code stored in a first basic input output system (BIOS) storage unit and a second boot block code stored in a second storage unit; and
an embedded controller disposed on the motherboard and coupled with the first BIOS storage unit, the second storage unit and the power button;
when a power supply supplies a standby power to the motherboard of the computer device, and the power button is not pressed, the embedded controller detects whether the first boot block code is damaged, and if the first boot block code is damaged, the embedded controller recovers the first boot block code via the second boot block code.

2. The computer device according to claim 1, wherein the power supply is a battery or an alternating current to direct current (AC-DC) converter.

3. The computer device according to claim 1, wherein the first BIOS storage unit further stores firmware of the embedded controller.

4. The computer device according to claim 1, wherein the embedded controller comprises a storage unit storing firmware of the embedded controller.

5. The computer device according to claim 1, wherein the computer device is a portable computer device, and the first BIOS storage unit and second storage unit is a non-volatile memory.

6. A method for recovering a BIOS of a computer device, wherein the computer device includes a motherboard, a power button, a first BIOS storage unit, a second storage unit and an embedded controller, and the first BIOS storage unit stores a first boot block code and the second storage unit stores a second boot block code, the method comprising the steps of:
providing a standby power by a power supply to the embedded controller on the motherboard;
before the power supply button is pressed, utilizing the embedded controller to detect whether the first boot block code is damaged; and
if the first boot block code is damaged, utilizing the embedded controller to recover the first boot block code via the second boot block code.

7. The method according to claim 6, wherein the power supply is a battery or an alternating current to direct current (AC-DC) converter.

* * * * *